United States Patent [19]

Kishimoto

[11] Patent Number: 4,811,273
[45] Date of Patent: Mar. 7, 1989

[54] ELECTRONIC DICTIONARY
[75] Inventor: Juji Kishimoto, Yokohama, Japan
[73] Assignee: Canon Kabushiki Kaisha, Tokyo, Japan
[21] Appl. No.: 556,062
[22] Filed: Nov. 29, 1983

Related U.S. Application Data
[63] Continuation of Ser. No. 227,204, Jan. 22, 1981, abandoned.

[30] Foreign Application Priority Data

Feb. 6, 1980 [JP] Japan ................... 55-13277

[51] Int. Cl.⁴ .............................................. G06F 9/00
[52] U.S. Cl. ................................................... 364/900
[58] Field of Search ................ 364/200, 900; 434/178, 434/335, 207

[56] References Cited
U.S. PATENT DOCUMENTS

| | | | |
|---|---|---|---|
| 4,158,236 | 6/1979 | Levy | 364/900 |
| 4,159,536 | 6/1979 | Kehoe et al. | 364/900 |
| 4,218,760 | 8/1980 | Levy | 364/900 |
| 4,245,405 | 1/1981 | Lien et al. | 434/178 |
| 4,393,460 | 7/1983 | Masuzawa et al. | 364/900 |

FOREIGN PATENT DOCUMENTS

2014765 8/1979 United Kingdom .

Primary Examiner—Thomas M. Heckler
Assistant Examiner—John G. Mills
Attorney, Agent, or Firm—Fitzpatrick, Cella, Harper & Scinto

[57] ABSTRACT

An electronic language learning apparatus includes a word memory for storing a plurality of words in one language and another memory for storing information for suppressing display of selected words of the plurality of words in the one language stored in the word memory. A designation control designates any one of the plurality of words in one language stored in the word memory and a discriminator, coupled to the designation control and to the memory, discriminates whether any one of the plurality of words stored in the word memory and designated by the designation control is to be displayed on the basis of the suppression information stored in the word memory.

15 Claims, 5 Drawing Sheets

| | | | | |
|---|---|---|---|---|
| 483 | 483 | ENTRANCE | 000000000 | IRIGUCHI | R09496; |
| 483 | 483 | ENTRANCE | 000000000 | IRIGUCHI | R09504; |
| 484 | 484 | EVENING | 000000000 | YUGATA | R09512; |
| 485 | 485 | EVERY DAY | 000110000 | MAINICHI | R09520; |
| 486 | 486 | EVERY OTHE | 000110001 | ICHINICHI OKINI | R09528; |
| 487 | 487 | -R DAY | 000110010 | *486 | R09536; |
| 487 | 487 | -R DAY | 000110010 | *486 | R09544; |
| 488 | 488 | EVERYONE | 000000000 | DAREDEMO, MINNA | R09552; |
| 489 | 489 | EVERYTHING | 000000000 | NANDEMO, SUBETE | R09560; |
| 48A | 48A | EXAMPLE | 000100000 | REI, MOHAN, TEHON | R09568; |
| 48B | 48B | EXCITED | 000110000 | KOFUNSHITA | R09576; |
| 48B | 48B | EXCITED | 000110000 | KOFUNSHITA | R09584; |
| 48C | 48C | EXCUSE ME | 000110000 | SHITSUREI, SUMIMASEN | R09592; |
| 48D | 48D | EXERCISE | 000000000 | RENSHU (SURU) | R09600; |
| 48E | 48E | EXPERIENCE | 000010000 | KEIKEN, TAIKEN | R09608; |
| 48F | 48F | EXPLAIN | 0001000000 | SETSUMEISURU | R09616; |
| 48F | 48F | EXPLAIN | 0001000000 | SETSUMEISURU | R09624; |

```
X000P00; X0C1P03; X277P07; XE43P06; X049P03; X1D8P05; X211P03; X5D5P07;
X111P03; X188P03; X000P00; X067P05; X1F7P08; X43BP06; XEFBP10; XEFBP10;
X219P04; X211P03; X311P04; X280P02; X000P00; X902P03; X177P07; X3F9P08;
X677P08; XB3BP08; X219P04; X235P05; XF21P06; X1C4P04; X700P03; X781P05;
X550P04; XEFBP10; XEFBP10; XF21P06; X219P04; X235P05; XF21P06; X497P06;
X2E8P05; X050P02; X550P04; X106P03; X57BP08; XEFBP10; X095P04; X067P05;
X93CP06; X000P00; X800P01; XFC4P07; X287P05; X200P01; X040P01; X040P01;
X219P04; X215P04; X712P05; X219P04; X000P00; X3F7P07; XA52P05; XDE2P07;
XE5FP09; XB14P05; X219P04; X215P04; X31CP05; X717P07; X2CCP05; X44AP04; X52CP05;
X4B7P07; X8B9P06; XA41P04; XE62P06; X66CP06; XDD2P07; X21BP05; X110P02; XCCFP08; X200P01;
X000P00; XA41P04; X1COP03; X000P00; X242P03; XE52P06; X76CP07; X21BP05; X18CP04;
XDE8P07; X1COP03; XDA8P06; X050P02; X000P00; X6ECP07; X2CFP07; XEFBP10; XE4CP06;
X21BP05; X1B8P05; X21BP05; XF4CP07; X215P04; X18CP04; X21BP05; X2D1P05; XA41P04;
X7DEP09; X36CP06; X21BP05; XF4CP07; XA3EP07; XE7BP09; X588P04; X000P00; XA6CP06; X211P03;
X2F4P06; X0BBP06; XF4CP07; X22CP04; XE7BP09; X3C1P05; X22CP04; X4C8P04; X56CP06; X211P03;
X188P03; X201P02; X22CP04; X22CP04; X21BP05; X4EFP08;
X10CP03; X440P02; X000P00; X351P05; X841P03; X328P04; XEFBP10; XEFBP10;
```

ELECTRONIC DICTIONARY

This application is a continuation of application Ser. No. 227,204, filed Jan. 22, 1981, now abandoned.

BACKGROUND OF THE INVENTION

1. Field of the Invention

This invention relates to an electronic learning machine, and more particularly to an instrument having an electronic dictionary function.

2. Description of the Prior Art

In the past, there have been instruments having an electronic dictionary function in which, for example, English words and their Japanese equivalents are stored in a memory and by operating the keys on the instrument, the English words in the memory are put out therefrom one after another. In such instruments, when they are used to learn English words, for instance, the English words can be repeatedly put out so that the operator can memorize them.

SUMMARY OF THE INVENTION

In view of the above-noted point, the present invention provides an electronic learning machine having a mode for blocking the putting-out of information (English words or words of other language) that the operator has already memorized and having the function of preventing such learned information from being readily put out during this mode.

It is another object of the present invention to provide an electronic instrument in which, when a cover is mounted on the body of the instrument, means for adjusting the luminance of a display element for displaying information is provided at a position that may be covered by the cover.

It is still another object of the present invention to provide an electronic instrument in which the lengths of key rows arranged in a plurality of lines differ between adjacent lines.

It is yet still another object of the present invention to provide an electronic instrument in which any one of a plurality of keys arranged on the top surface of the instrument body is provided on a side of the body.

It is a further object of the present invention to provide an electronic dictionary having a memory capable of storing therein information corresponding to and regarding each of a plurality of words stored in a memory.

Other objects of the present invention will become apparent from the following detailed description of an embodiment thereof taken in conjunction with the accompanying drawings.

DESCRIPTION OF THE PREFERRED EMBODIMENT

Figure 1:
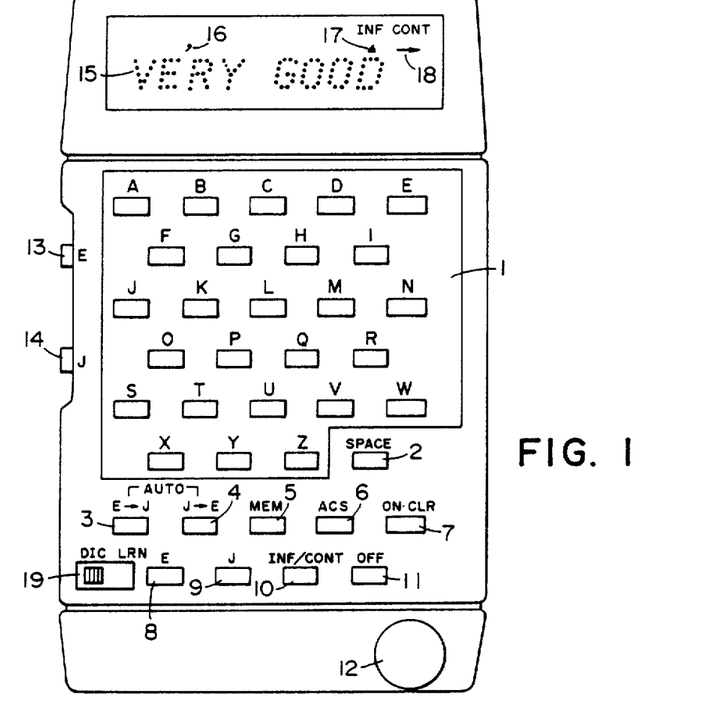
FIG. 1 shows the appearance of the electronic learning machine of the present invention.

Referring to FIG. 1, it shows the appearance of the electronic learning machine according to the present invention.

In FIG. 1, reference numeral 1 designates alphabet keys which respectively correspond to 26 alphabetical characters with which specific words or information may be input into the machine. In this embodiment, as shown, the alphabet keys are arranged in an X array in which each key row of a matrix arrangement differs in width from an adjacent key row. Such arrangement helps an operator to visually locate the keys arranged in each line of the key arrangement.

For example, the keys on a first line (A, B, C, D, E), the keys on a second line (F, G, H, I), . . . , the keys on an eighth line are arranged parallel to one another with an equal spacing interposed between adjacent lines. The keys belonging to any odd-number line are positioned on the same straight line and the keys belonging to any even-number line are positioned on the same straight line. The keys on any even-number line are positioned intermediate of the keys on any odd-number line.

Designated by 2 is a space key used when entering a phrase comprising a plurality of English words into the instrument, and it is a key for providing a space between English words.

Denoted by 3 is an auto English-Japanese set key which is a key for accessing at random information contents (for example, English words) stored in the instrument.

Designated by 4 is an auto Japanese-English set key which is a key for accessing at random information contents (for example, Japanese equivalents of English words) stored in the instrument.

Reference numeral 5 designates a memory input key which when actuated causes information English words or their Japanese equivalents input through the keys 1 and which the learner particularly wants to study to be stored into a particular memory capable of writing and reading out such information.

Denoted by 6 is a memory access key for accessing the information English words or their Japanese equivalents entered by the memory inut key 5.

Reference numeral 7 denotes a key for effecting the instructions such as operation of the display, clearing of the memory and clearing of the input.

Designated by 8 is an English access key for outputting or retrieving for display at random in succession the words input by the alphabet keys 1 or information English words when the auto English-Japanese set key 3 is set. Also, when the auto Japanese-English set key 4 is set, an English word equivalent to the Japanese word being displayed by a Japanese access key 9 is obtained by an English access key 8.

Denoted by 9 is a Japanese access key by which may be output or retrieved a Japanese equivalent of an English word designated by the alphabet keys 1 or a Japanese equivalent of an English word being displayed when the English-Japanese set key 3 is set. Also, when the auto Japanese-English set key 4 is being operated, Japanese words are accessed at random by the operation of the Japanese access key 9.

Reference numeral 10 designates a conjugation form key. If a particular conjugation form of a word has been displayed, when this key is operated that conjugation form is also displayed. Also, when this key is operated when a compound word mark has been displayed, an indication thereof is also displayed.

Designated by 11 is a key for turning off the display.

Denoted by 12 is an adjust dial for changing the display luminance.

Reference numeral 13 designates an English access button provided in a recess formed in one side of the instrument to provide the operability of the instrument, namely, to enable the instrument to be operated by one hand. This button provides the same instruction to the instrument as does the English access key 8.

Reference numeral 14 denotes a Japanese access button disposed in a recess formed in one side of the instrument to provide the operability of the instrument, namely, to enable the instrument to be operated by one hand. This button gives the instrument the same instruction as does the Japanese access key 9.

Designated by 15 is a main display portion which uses liquid crystal as the display element and may display alphanumeric characters in a dot matrix form.

Denoted by 16 is an accent display portion which is provided with a number of display elements corresponding to words which may be displayed.

Reference numeral 17 designates a conjugation display portion which may effect display when an information English word displayed is a conjugation of verb, singular or plural of noun, a conjugation of adjective, an associated word, or an associated phrase or conjugation.

Denoted by 18 is a long-word display portion which may be driven to indicate that the word or information being retrieved cannot all be displayed at one time, that is, the word or information is of length that exceeds the capacity of the main display portion.

Designated by 19 is a switch for selecting a dictionary ⟵⟶ learning mode. When this switch has been set to the learning mode, it is possible to cause once learned information not to be temporarily output by effecting a key operation which will later be described. On the other hand, when this switch has been set to the dictionary position, the information stored in the instrument may be put out at random.

Figure 2:
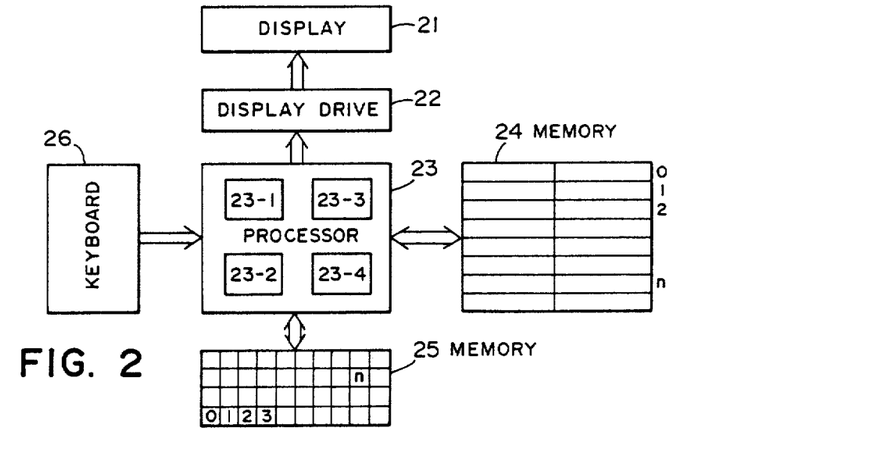
FIG. 2 is a block diagram of the embodiment shown in FIG. 1.

FIG. 2 is a block diagram of the elecronic learning machine shown in FIG. 1. In FIG. 2, reference numeral 21 designates a display device which comprises the main display portion 15, the accent display portion 16, the conjugation display portion 17 and the long-word display portion shown in FIG. 1 and effects display in a time-division fashion. The main display portion 15 is constituted, for example, by one 5×8 dot matrix per character, and contains therein display elements corresponding to ten words.

Designated by 22 is a display drive circuit which is a CMOS integrated circuit for converting an applied display information signal into a signal for driving the display device 21.

Figure 3:
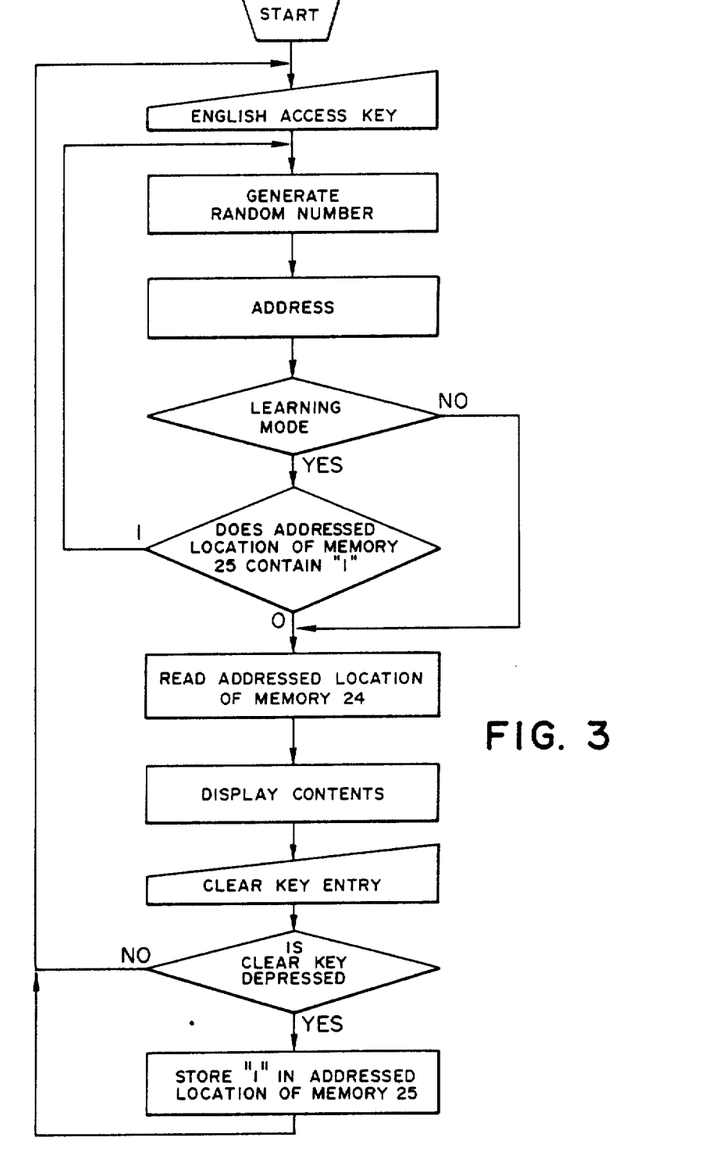
FIG. 3 is a chart showing the control procedures.

Denoted by 23 is a processor which includes an operational portion 23-1, a read only memory 23-2 having stored therein the program as shown in FIG. 3, a decoding control circuit 23-3 and a memory 23-4.

Figure 4:
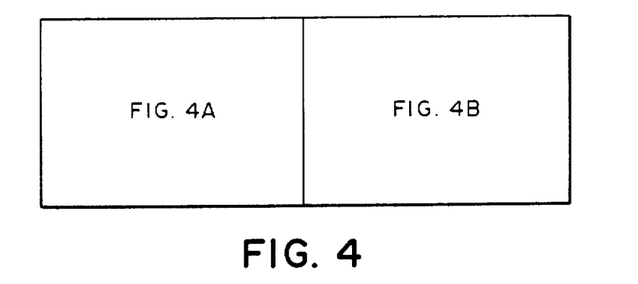
FIG. 4 depicts an arrangement of FIGS. 4A and 4B which together show an example of the contents of a memory 24.
Figure 4A:
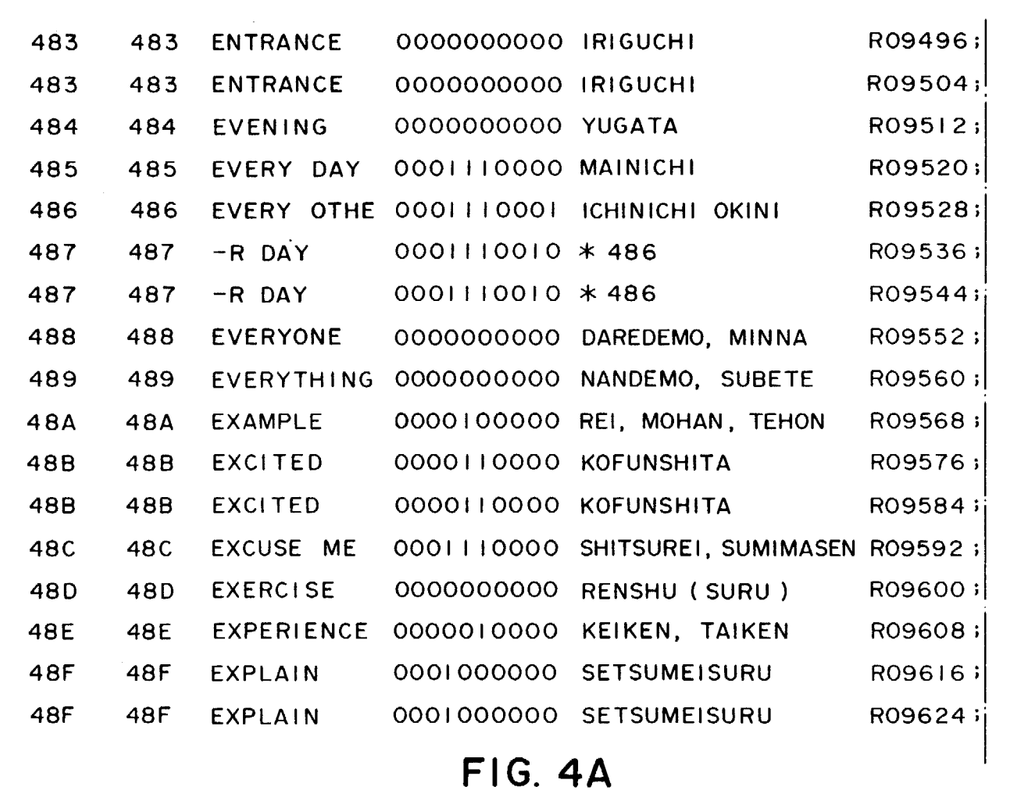
Figure 4B:
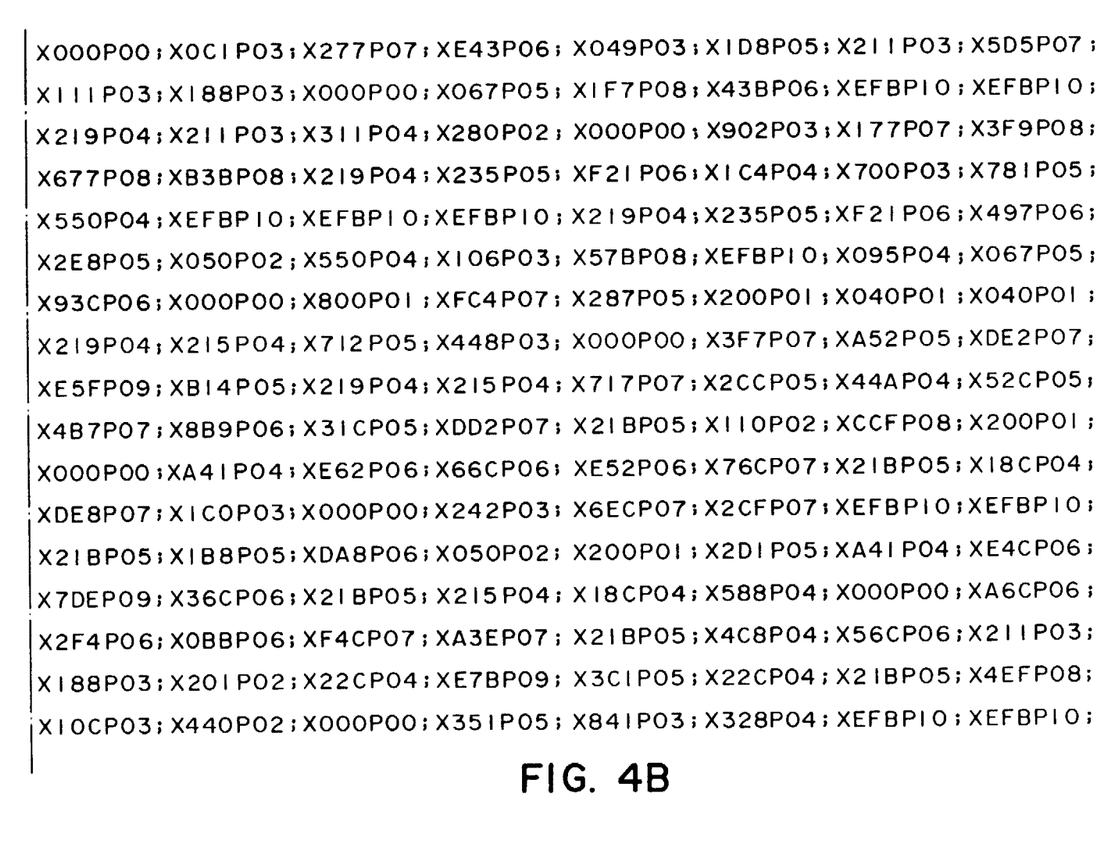

Reference numeral 24 designates a word memory such as a read only memory (ROM) in which English words and their Japanese equivalents are stored in such a form as shown in FIG. 4A and 4B.

Reference numeral 25 denotes a read-write or random access memory (RAM) which corresponds, in one-to-one relationship, to the addresses of the information English words stored in the memory 24 and in which the information regarding already learned English words may be stored. In the case of an already learned English word, this memory 25 is caused to memorize 1, and in the case of an unlearned English word, this memory 25 is caused to memorize 0. For Example, as shown in FIGS. 4A and 4B, 1 bit (0 or 1) of the contents of the address 483 of the memory 25 corresponds to ENTRANCE . . . IRIGUCHI.

Designated by 26 is a keyboard which has keys and switch buttons except the adjust dial 12 shown in FIG. 1 and which is used to enter the signals for the operating keys in a conventional manner in accordance with the key input routine stored in the read only memory of the processor of FIG. 2.

The operation of the present embodiment comprising the above-described construction will now be described with reference to FIG. 3.

The selection switch 19 is first operated to set the instrument to the learning mode or dictionary mode. Such setting of the mode is memorized in the processor 23. Next, if in the learning mode when the auto English-Japanese set key 3 is operated, such operation of this key is memorized in the memory 23-4 of the processor 23. When the English access key 8 is depressed, the processor 23 generates a random number. By this, a particular address in the memory, which is to cause an English word stored in the memory 24 to be displayed, is designated. The processor 23 examines to which mode the switch 19 has been set. In the present case, the switch 19 is set to the learning mode and therefore, the program proceeds to a step for searching for the contents of the RAM 25 and inspecting whether the contents of the designated address are 0 or 1. If the mode is not the learning mode but the dictionary mode, the program jumps over the aforementioned inspection step. When said contents are 1, a random number is again generated to effect a new address designation. Where the contents of the memory 25 corresponding to the address designated by the random number are 0, the contents of the memory 24 are retrieved by to the processor 23 and are displayed by the display device 21 through the display drive circuit 22. Thereafter, the processor 23 detects actuation of the key 7 and when the key 7 has been depressed, the processor causes 1 to be entered into the addressed location of the memory 25 and thus causes the information indicating that the corresponding word has already been learned to be entered therein. When the key 7 is not operated, the processor responds to the next operation of the English access key 8. By effecting the above-described operation, it is possible to clear an already learned unnecessary English word (to cause such word not to be repeatedly put out) and further, when the dictionary mode has been designated, this operation is not effected and therefore, all the contents that are contained in the memory 24 can be retrieved for display.

Even when the English access button 13, instead of the English access key 8, is operated, the same operation takes place and by one-hand operation, an English word can be put out to the display portion 15 during each button operation.

Figure 5:
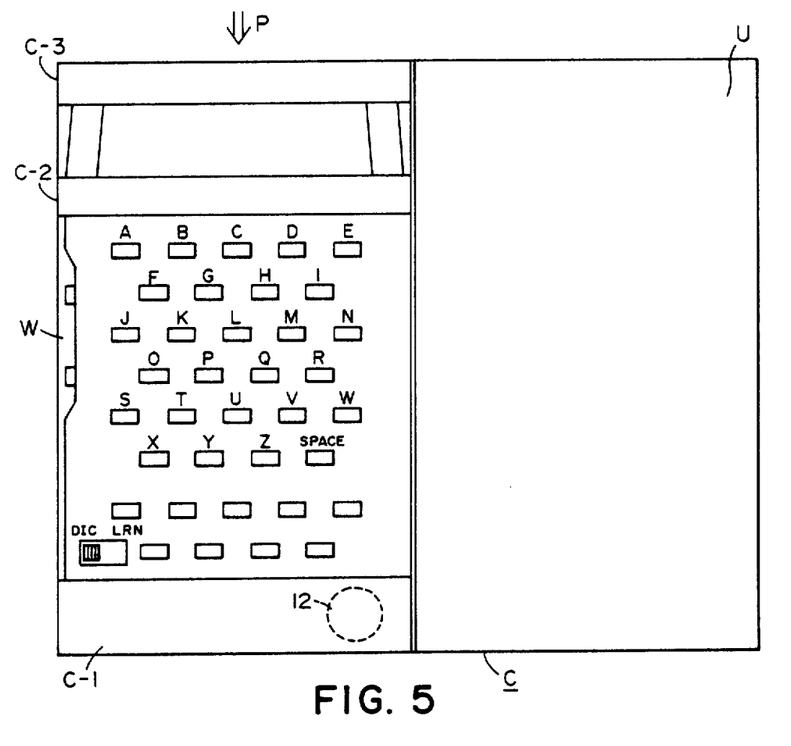
FIG. 5 shows the appearance of the machine with a cover mounted thereon.

Further, where the electronic learning machine of the previously described embodiment is used with a cover C mounted thereon as shown in FIG. 5, the adjust dial 12 for adjusting the luminance of the display device 21 is hidden by a portion C-1 of the cover C and thus, the dial is not moved by unnecessary operation.

The cover C is constructed in the form of a memo-book having a bottom plate W and a right side plate U, and the bottom of the bottom plate W has a band C-1 having a bottom and two bands C-2 and C-3 in the upper portion thereof, so that by inserting the electronic learning machine between the bands C-1, C-2, C-3 and the bottom plate W in the direction of arrow P, the machine can be disposed at the position as shown. The two bands C-3 and C-2 are so provided that the display of the display device appears between these bands.

While the above embodiment has been shown with respect to Japanese-English conversion, the substance of the present invention is also applicable to conversion between other languages.

In the above-described embodiment, the RAM 25 has a 1-bit capacity for one word, but the memory capacity for one word may be increased so as to enable comments to be stored therein.

What I claim is:

1. An electronic language learning apparatus, comprising;
   word memory means for storing a plurality of words in one language;
   memory means for storing suppression information for suppressing display of selected words of said plurality of words in one language stored in said word memory means, said memory means including a memory location for storing said suppression information relating to each of said plurality of words;
   means for entering said suppression information into said memory means;
   designation means for designating any one of said plurality of words of one language stored in said word memory means; and
   discrimination means coupled to said designation means and to said memory means for discriminating whether any one of said plurality of words stored in said word memory means and designated by said designation means is to be displayed on the basis of said suppression information stored in said memory means.

2. An electronic language learning apparatus according to claim 1, further comprising means for visually displaying any of said plurality of words stored in said word memory means in accordance with the discrimination by said discrimination means.

3. An electronic language learning apparatus according to claim 1, further comprising a mode selector for selecting an operating mode of said apparatus, said mode selector comprising means for enabling said discrimination means in one mode selected by said mode selector.

4. An electronic language learning apparatus according to claim 1, wherein said word memory means comprises a ROM.

5. An electronic language learning apparatus according to claim 4, wherein said memory means comprises a read-write memory.

6. An electronic language learning apparatus, comprising:
   memory means for storing each word of a plurality of words in one language and discrimination information related to each of said plurality of words;
   means for entering said discrimination information into said memory means in relation to any one of said plurality of words;
   designation means for designating any of said plurality of words stored in said memory means;
   discrimination means, coupled to said memory means and said designation means, for discriminating said discrimination information related to each word designated by said designation means; and
   control means for controlling visual display of said word designated by said designation means on the basis of the discrimination of said discrimination information related to said designated word by said discrimination means.

7. An electronic language learning apparatus according to claim 6, further comprising manually operable means for enabling said discrimination means.

8. An electronic language learning apparatus, comprising:
   selection means for selecting either one of a first mode and a second mode of operation;
   memory means for storing a plurality of information and a plurality of sub-information each related to one of said plurality of information;
   means for entering said sub-information into said memory means in relation to any one of said information;
   designation means coupled to said memory means for accessing any one of said plurality of information;
   first control means for enabling access of any one of said plurality of information from said memory means in accordance with the designation by said designation means when said selection means selects said first mode; and
   second control means for enabling access of any one of said plurality of information corresponding to any one of said plurality of said sub-information upon discriminating the nature of said any one of said plurality of sub-information in accordance with the designation by said designation means when said selection means selects said second mode.

9. An electronic language learning apparatus according to claim 8, further comprising means for rewriting said plurality of sub-information.

10. An electronic language learning apparatus according to claim 8, further comprising means for visually displaying said plurality of information stored in said memory means in accordance with access enabled by said first and said second control means.

11. An electronic language learning apparatus, comprising:
    information memory means for storing a plurality of information;
    memory means for storing output information for suppressing output of any selected information of said plurality of information;
    means for entering said output information into said memory means for any selected information of said plurality of information;
    designation means for designating any of said plurality of information stored in said information memory means, and
    discrimination means coupled to said designation means and to said memory means for visually displaying any of said plurality of information stored in said information memory means on the basis of said output information stored in said memory means.

12. An electronic language learning apparatus according to claim 11, wherein said means for entering said output information into said memory means comprises manually operable means.

13. An electronic language learning apparatus according to claim 11, further comprising means for visually displaying any of said plurality of information stored in said memory means in accordance with the discrimination by said discrimination means.

14. An electronic language learning apparatus, comprising:

memory means for storing each of a plurality of items and a plurality of sub-information each related to one said item;

means for entering said sub-information into said memory means in relation to any one of said items;

designation means for designating any one of said items stored in said memory means;

discrimination means coupled to said memory means and to said designation means for discriminating said sub-information related to a designated item in response to designation by said designation means; and control means for controlling visual display of said designated item in accordance with discrimination by said discrimination means.

15. An electronic language learning apparatus according to claim 14, further comprising manually operable means for enabling said discrimination means.

* * * * *

UNITED STATES PATENT AND TRADEMARK OFFICE
CERTIFICATE OF CORRECTION

PATENT NO. : 4,811,273
DATED : March 7, 1989
INVENTOR(S) : JUJI KISHIMOTO

It is certified that error appears in the above-identified patent and that said Letters Patent is hereby corrected as shown below:

COLUMN 3

Line 48, "display portion" should read --display portion 18--.
    Line 64, "FIG. 4A and 4B." should read --FIGS. 4A and 4B.--.

COLUMN 6

Line 60, "means," should read --means;--.

Signed and Sealed this

Thirty-first Day of October, 1989

Attest:

DONALD J. QUIGG

*Attesting Officer*    *Commissioner of Patents and Trademarks*